United States Patent Office 3,752,886
Patented Aug. 14, 1973

3,752,886
LYSOLECITHINS AS IMMUNOLOGIC ADJUVANTS
Paul Gerhard Munder, Siegelau, near Waldkirch, and Herbert Fischer, Burg, near Kirchzarten, Germany, assignors to Boehringer Ingelheim GmbH, Ingelheim am Rhein, Germany
No Drawing. Filed Feb. 23, 1971, Ser. No. 118,084
Claims priority, application Germany, Feb. 27, 1970,
P 20 09 343.0
Int. Cl. A61k 27/00
U.S. Cl. 424—199
7 Claims

ABSTRACT OF THE DISCLOSURE

Pharmaceutical immunologic adjuvant dosage unit compositions consisting essentially of an inert pharmaceutical carrier and an effective immunologic adjuvant dose of a lysolecithin of the formula

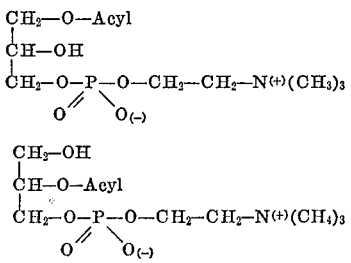

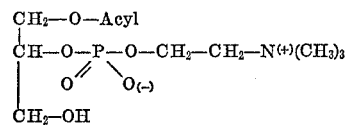

or

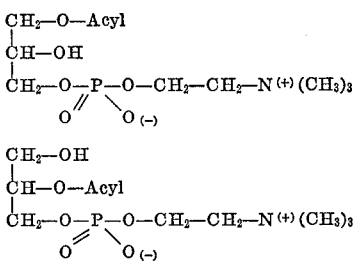

wherein Acyl is acyl of an aliphatic fatty acid; and a method of enhancing antigenicity and improving immune response in warm-blooded animals with the aid of such compositions.

---

This invention relates to novel pharmaceutical immunologic adjuvant compositions containing a lysolecithin as the active ingredient, as well to a method of enhancing antigenicity and improving immune response in warm-blooded animals therewith.

More particularly, the present invention relates to pharmaceutical immunologic adjuvant compositions consisting essentially of an inert pharmaceutical carrier and an effective immunologic adjvant dose of a lysolecithin of the formula $$CH_2-O-Acyl$$
$$CH-OH$$
$$CH_2-O-P(=O)(O^-)-O-CH_2-CH_2-N^{(+)}(CH_3)_3 \quad (Ia)$$

$$CH_2-OH$$
$$CH-O-Acyl$$
$$CH_2-O-P(=O)(O^-)-O-CH_2-CH_2-N^{(+)}(CH_3)_3 \quad (Ib)$$

or $$CH_2-O-Acyl$$
$$CH-O-P(=O)(O^-)-O-CH_2-CH_2-N^{(+)}(CH_3)_3$$
$$CH_2-OH \quad (Ic)$$

wherein each Acyl is acyl of an aliphatic fatty acid, such as palmitoyl or stearoyl.

Since the carbon atom in the β-position of the glycerin moiety represents an asymmetric center, these compounds may each occur in two stereoisomeric forms.

PRIOR ART

The lysolecithins of the Formulas Ia, Ib and Ic above are known compounds and may be produced by chemical or enzymatic means [G. H. de Haas and L. L. M. van Deenen, Biochem. biophysica Acta (Amsterdam), 106 (1965) 315; and D. Arnold, H. U. Weltzien and O. Westphal, Liebigs Ann. Chem. 709 (1967) 231, 234]. Thus, for example, the lysolecithins may be produced by enzymatic cleavage of a fatty acid from lecithins by the action of phospholipase $A_1$ or $A_2$. These enzymatic reactions are stereospecific. However, the phospholipases $A_1$ and $A_2$ can only attack L-lecithins. Therefore, when racemic lecithins are employed, enzymatic cleavage with phospholipase A yields a mixture of L-lysolecithin and D-lecithin, which can be resolved by chromatography into its individual components. Lysolecithins corresponding to Formula Ia, for example, may be produced by purely chemical means, starting from 2-benzyl-glycerin, by acylation, introduction of the phosphorus choline group and hydrogenolytic removal of the protective benzyl group, in accordance with the following schematic reaction sequence. The synthesis may also serve for the production of optically active lysolecithins.

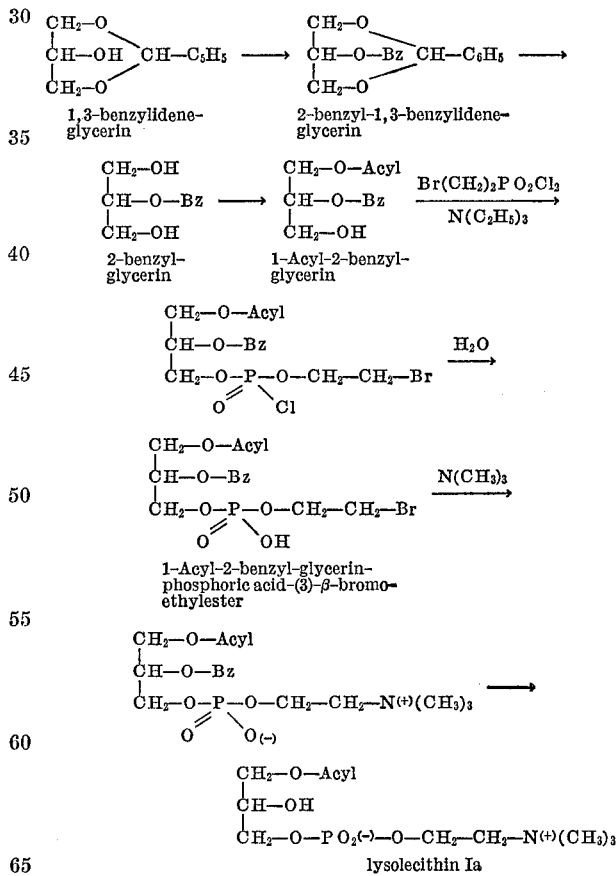

In these formulas Bz stands for benzyl and Acyl has the same meaning as in Formulas Ia, Ib and Ic.

Thus, for instance, the above-cited literature references disclose the preparation of the following particular lysolecithins of the Formulas Ia, Ib and Ic by the reaction sequence shown above:

1-palmitoyl-glycerin-phosphoric acid-(3)-monocholine ester monohydrate
1-stearoyl-glycerin-phosphoric acid-(3)-monochloline ester monohydrate
1-stearoyl-glycerin-phosphoric acid-(2)-monocholine ester monohydrate
3-stearoyl-glycerin-phosphoric acid-(2)-monocholine ester monohydrate
2-stearoyl-glycerin-phosphoric acid-(3)-monocholine ester monohydrate
2-stearoyl-glycerin-phosphoric acid-(1)-monocholine ester monohydrate

BACKGROUND OF THE INVENTION

Lysolecithins occupy an important key position in the intermediary phospholide metabolism of the cell membranes. Within a dynamic metabolic equilibrium they are constantly formed from lecithins and, on the other hand, reacylated to lecithins or degraded to glycerophosphoryl choline.

D-lysolecithins, however, are reacylated by acyl-transferase only to a degree of less than 10%, and thus represent exceptionally valuable immunologic adjuvants.

Lysolecithins are substances with a high interfacial activity. Their most pronounced biological activity is the cytotoxic action. This cell-damaging action is based essentially on their ability to destroy cell membranes. Nevertheless, these compounds show a relatively high $LD_{50}$-value in animal tests, which applies especially to the L-lysolecithins, as these are quickly metabolized in the organism.

However, lysophosphatides are by no means merely cytotoxic substances; depending upon the dosage, they exhibit important biological activities which, because of their high surface activity, probably unfold at interfaces. Thus, for instance, it is known that lysophosphatides are the main receptors in the membranes for the absorption of fatty acids from serum. Pretreatment with sublytic quantities of a lysolecithin even improves the cell membranes.

Furthermore, from the scientific literature it is known that lysolecithins stimulate increased bacterial growth, increase the phagocytosis of peritoneal macrophages, and can even promote the growth of cells of higher organisms.

THE INVENTION

We have now discovered that the lysolecithins of the Formulas Ia, Ib and Ic are excellent immunologic adjuvants.

In immunology, adjuvants are understood to be substances which, when mixed with an antigen, enhance antigenicity and increase the immune response of the organism to an antigenic stimulus, i.e. the formation of antibodies. With the aid of adjuvants it is, for instance, possible to counteract the so-called immunoparalysis, that is, to initiate the formation of antibodies even with those antigens which are otherwise tolerated by the organism.

Thus, for example, a purely practical utility for these compounds is the increase of antibody titres of sera.

The immunologic adjuvant activity of the lysolecithins of the Formulas Ia, Ib and Ic was ascertained as follows:

(1) The test was carried out in analogy to the method of Dresser [Immunology 9 (1965) 261]. The basic principle of this test procedure consists in the inducement of tolerance by means of a soluble protein. This test procedure determines the ability of substances to increase the immune response in the organism against the extremely weak immunogenic bovine gammaglobulin (BGG) to the degree that antibodies for this protein may be clearly proven. For this purpose, mice are administered a 5 mgm. dose of centrifuged, aggregate-free BGG by intraperitoneal injection. Normally, with this dose no antibodies are detectable after 8 to 10 days, which means that the animals are not immunized, and under these conditions they are incapable of an immune response to BGG. However, administration of BGG in combination with an immunologic adjuvant prevents the temporary development of tolerance, and the animals then form antibodies against BGG which they normally tolerate. Some 10 to 12 days following initial administration of the tolerific protein, BGG labeled with iodine-125 was again injected. If the animals are tolerant, the labeled antigen is slowly broken down similar to endogenous gammaglobulin. On the other hand, if the animals are immune, a so-called immune elimination takes place, i.e., the labeled antigen is removed from the circulation at a much more rapid rate. Thus, the speed of elimination of iodine-125-labeled BGG is a measure of antibodies formation.

In tests with natural lysolecithin it was found that animals treated wth labeled BGG and lysolecithin eliminated the tracer protein from the circulation about 10 to 100 times faster than saline-treated controls.

(2) Another immunologic test method for antibodies by which immunologic adjuvant properties can be determined is based on the principle that the immunogen (BGG) is coupled with erythrocytes, and the thus treated cells are incubated for 20 hours at 4° C. with serum in a geometric series of dilution. If the serum contains antibodies, the erythrocyte agglutinates. The highest concentration at which this phenomenon can still be observed is known as the antibody-titer of the serum.

This considerably less accurate method, however, also clearly proved that lysolecithins are highly active immunologic adjuvants.

For pharmaceutical purposes the lysolecithins of the Formulas Ia, Ib or Ic are administered to warm-blooded animals perorally or parenterally, but preferably by intraperitoneal injection, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups suppositories and the like. One effective immunologic adjuvant dosage unit of the lysolecithins of the Formulas Ia, Ib or Ic is from 0.5 to 10 mgm./kg. body weight, depending upon the degree of potentiation of immune response desired.

The following examples illustrate a few dosage unit compositions comprising a lysolecithin as an active ingredient and represent the best modes contemplated of putting the invention into practical use. The parts are parts by weight unless otherwise specified.

EXAMPLE 1

Coated pills

The pill core composition is compounded from the following ingredients:

| | Parts |
|---|---|
| 1-palmitoyl-glycerin-phosphoric acid - (3) - monocholine ester monohydrate | 100.0 |
| Secondary calcium phosphate, anhydrous | 73.0 |
| Corn starch | 55.0 |
| Polyvinylpyrrolidone | 5.0 |
| Carboxymethyl cellulose | 5.0 |
| Magnesium stearate | 2.0 |
| Total | 240.0 |

Preparation

The lysolecithin is intimately admixed with the calcium phosphate and the corn starch, the resulting mixture is moistened with an ethanolic 10% solution of the polyvinylpyrrolidone, the moist mass is forced through a 1.5 mm.-mesh screen, the resulting granulate is dried at 45° C. and again passed through the screen, the dry granulate is uniformly admixed with the carboxymethyl cellulose and the magnesium stearate, and the finished composition is compressed into 240 mgm.-pill cores which are subsequently coated with a thin shell consisting essentially of a mixture of talcum and sugar. Each coated pill contains 100 mgm. of the lysolecithin and is an oral dosage unit composition with effective immunologic adjuvant action.

EXAMPLE 2

Tablets

The tablet composition is compounded from the following ingredients:

| | Parts |
|---|---|
| 1-stearoyl-glycerin-phosphoric acid - (3) - monocholine ester monohydrate | 200.0 |
| Lactose | 100.0 |
| Corn starch | 80.0 |
| Polyvinylpyrrolidone | 12.0 |
| Cellulose, microcrystalline | 54.0 |
| Magnesium stearate | 4.0 |
| Total | 450.0 |

Preparation

The lysolecithin is intimately admixed with the lactose, the corn starch and the polyvinylpyrrolidone, the mixture is moistened with water; the moist mass is forced through a 1.5 mm.-mesh screen, dried at 45° C. and again passed through the screen; the resulting dry granulate is uniformly admixed with the cellulose and the magnesium stearate, and the finished composition is compressed into 450 mgm.-tablets. Each tablet contains 200 mgm. of the lysolecithin and is an oral dosage unit composition with effective immunologic adjuvant action.

EXAMPLE 3

Drop solution

The solution is compounded from the following ingredients:

| | Parts by vol. |
|---|---|
| 3-stearoyl-glycerin-phosphoric acid - (2) - monochlorine ester monohydrate | 1.0 |
| Methyl p-hydroxybenzoate | 0.035 |
| Propyl p-hydroxybenzoate | 0.015 |
| Propyleneglycol | 45.0 |
| Oil of anise | 0.05 |
| Menthol | 0.05 |
| Saccharin sodium | 1.0 |
| Ethanol | 1.0 |
| Distilled water, q.s. ad. | 100.0 |

Preparation

The propyleneglycol is admixed with 45 parts of distilled water, and the lysolecithin is dissolved in the mixture (solution A). The p-hydroxybenzoates, the menthol and the oil of anise are dissolved in the ethanol (solution B). Solutions A and B are admixed, the saccharin sodium is added, and the resulting solution is diluted with distilled water to the indicated volume and filtered. 1 ml. of the filtrate (about 20 drops) contains 10 mgm. of the lysolecithin and is an oral dosage unit composition with effective immunologic adjuvant action.

EXAMPLE 4

Hypodermic solution

The solution is compounded from the following ingredients:

| | Parts by vol. |
|---|---|
| 2-stearoyl-glycerin-phosphoric acid - (3) - monocholine ester monohydrate | 50.0 |
| Polypropyleneglycol | 2500.0 |
| Tartaric acid | 15.0 |
| Distilled water, q.s. ad. | 5000.0 |

Preparation 2000 parts of distilled water are heated to about 50° C., and then the indicated amount of polypropyleneglycol is added thereto; thereafter, the lysolecithin and the tartaric acid are dissolved therein, and the resulting solution is diluted with additional distilled water to the indicated volume. The finished solution is filtered until free from suspended particles, and the filtrate is filled into 5 ml.-ampules which are then sealed and sterilized. Each ampule contains 50 mgm. of the lysolecithin, and the contents thereof are an intraperitoneally injectable dosage unit composition with effective immunologic adjuvant action.

Analogous results are obtained when any one of the other lysolecithins embraced by Formulas Ia, Ib and Ic was substituted for the particular lysolecithin in Examples 1 through 4. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of enhancing antigenicity and improving immune response in a warm-blooded animal, which comprises perorally or parenterally administering to said animal an effective immunologic adjuvant amount of a lysolecithin of the formula

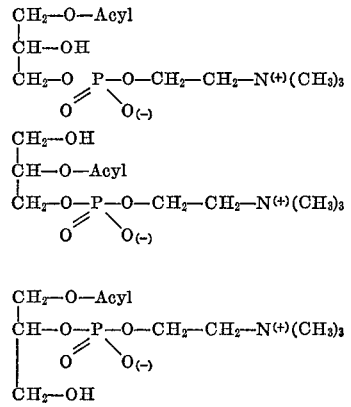

wherein Acyl is a higher alkanoyl of 16 or 18 carbons.

2. The method of claim 1, wherein said lysolecithin is 1-palmitoyl-glycerin-phosphoric acid - (3) - monocholine ester monohydrate.

3. The method of claim 1, wherein said lysolecithin is 1-stearoyl-glycerin-phosphoric acid - (3) - monocholine ester monohydrate.

4. The method of claim 1, wherein said lysolecithin is 1-stearoyl-glycerin-phosphoric acid - (2) - monocholine ester monohydrate.

5. The method of claim 1, wherein said lysolecithin is 3-stearoyl-glycerin-phosphoric acid - (2) - monocholine ester monohydrate.

6. The method of claim 1, wherein said lysolecithin is 2-stearoyl-glycerin-phosphoric acid - (3) - monocholine ester monohydrate.

7. The method of claim 1, wherein said lysolecithin is 2-stearoyl-glycerin-phosphoric acid - (1) - monocholine ester monohydrate.

References Cited

UNITED STATES PATENTS 3,592,829    7/1971    Betzing _____ 260—403

FOREIGN PATENTS 823,489    11/1959    Great Britain _____ 424—88

OTHER REFERENCES

Recueil: 82 (1963), pp. 469–473.
Chemical Abstracts 51 (1957) 13181; vol. 65 (1966) 2826.

ALBERT T. MEYERS, Primary Examiner
F. E. WADDELL, Assistant Examiner

U.S. Cl. X.R.

424—88